(12) United States Patent
Townend et al.

(10) Patent No.: US 10,015,686 B2
(45) Date of Patent: Jul. 3, 2018

(54) ACCESS POINT GROUPING BASED ON PERFORMANCE AND LOCATION

(71) Applicant: British Telecommunications Public Limited Company, London (GB)

(72) Inventors: David Townend, London (GB); Francis Scahill, London (GB); Simon Ringland, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/300,718

(22) PCT Filed: Mar. 26, 2015

(86) PCT No.: PCT/GB2015/050907
§ 371 (c)(1),
(2) Date: Sep. 29, 2016

(87) PCT Pub. No.: WO2015/150744
PCT Pub. Date: Oct. 8, 2015

(65) Prior Publication Data
US 2017/0111807 A1    Apr. 20, 2017

(30) Foreign Application Priority Data

Mar. 31, 2014  (EP) .................................. 14250060
Mar. 31, 2014  (EP) .................................. 14250061
Jun. 30, 2014  (EP) .................................. 14175108

(51) Int. Cl.
*H04W 24/00* (2009.01)
*H04W 24/04* (2009.01)
(Continued)

(52) U.S. Cl.
CPC ............. *H04W 24/04* (2013.01); *H04L 43/16* (2013.01); *H04W 4/02* (2013.01); *H04W 24/08* (2013.01); *H04W 84/12* (2013.01)

(58) Field of Classification Search
None
See application file for complete search history.

(56) References Cited

U.S. PATENT DOCUMENTS 8,392,712 B1   3/2013  Wilson
8,576,812 B2 * 11/2013  Gray ................... H04L 63/1416
                                                          370/338
(Continued)

FOREIGN PATENT DOCUMENTS

EP        2025106 B9    2/2009
EP        2477435 A1    7/2012
(Continued)

OTHER PUBLICATIONS

U.S. Appl. No. 15/300,592, filed Sep. 29, 2016. Inventors: Townend et al.

(Continued)

*Primary Examiner* — Erika Washington
(74) *Attorney, Agent, or Firm* — Amy M. Salmela; Patterson Thuente Pedersen, P.A.

(57) ABSTRACT

In a system of wireless access point routing devices each creating a wireless network, a management server monitors the performance of the wireless networks to identify performance degradation. Any wireless networks experiencing performance degradation are grouped by region to determine whether a common cause for the degradation is present.

10 Claims, 9 Drawing Sheets

(51) Int. Cl.
*H04W 24/08* (2009.01)
*H04W 4/02* (2018.01)
*H04L 12/26* (2006.01)
*H04W 84/12* (2009.01)

(56) References Cited

U.S. PATENT DOCUMENTS

| | | | |
|---|---|---|---|
| 2003/0123420 A1* | 7/2003 | Sherlock | H04W 24/00 |
| | | | 370/338 |
| 2003/0161341 A1 | 8/2003 | Wu et al. | |
| 2007/0105544 A1 | 5/2007 | Veres et al. | |
| 2008/0253314 A1 | 10/2008 | Stephenson et al. | |
| 2009/0154363 A1 | 6/2009 | Stephens | |
| 2009/0310501 A1 | 12/2009 | Catovic et al. | |
| 2013/0053023 A1 | 2/2013 | Meredith et al. | |
| 2013/0157688 A1 | 6/2013 | Kateley et al. | |
| 2013/0294263 A1 | 11/2013 | Haga et al. | |
| 2015/0051872 A1 | 2/2015 | Arora et al. | |
| 2017/0111813 A1 | 4/2017 | Townend et al. | |
| 2017/0118091 A1 | 4/2017 | Townend et al. | |
| 2017/0181059 A1 | 6/2017 | Townend et al. | |

FOREIGN PATENT DOCUMENTS

| | | |
|---|---|---|
| EP | 2482490 A1 | 8/2012 |
| EP | 2530875 A1 | 12/2012 |
| EP | 2632071 A1 | 8/2013 |
| EP | 2680494 A1 | 1/2014 |
| EP | 2720409 A1 | 4/2014 |
| WO | WO 2008/008990 A2 | 1/2008 |

OTHER PUBLICATIONS

U.S. Appl. No. 15/300,679, filed Sep. 29, 2016. Inventors: Townend et al.
TR-069 CPE WAN Management Protocol, Issue: 1 Amendment 5, Nov. 2013, 228 pages.
Cisco Systems NetFlow Services Export Version 9, Oct. 2004, 29 pages.
G.hn Management and Diagnostics Specifications, May 2010; 12 pages.
International Search Report for corresponding International Application No. PCT/GB2015/050907 dated Mar. 6, 2015; 4 pages.
Written Opinion of the International Searching Authority for corresponding International Application No. PCT/GB2015/050907 dated Mar. 6, 2015; 6 pages.
Application and Filing Receipt for U.S. Appl. No. 15/300,156, filed Sep. 28, 2016, Inventor(s): Townend et al.
International Search Report for corresponding International Application No. PCT/GB2016/050908 dated Jun. 15, 2015; 4 pages.
Written Opinion of the International Searching Authority for corresponding International Application No. PCT/GB2016/050908 dated Jun. 15, 2015; 6 pages.
International Search Report for corresponding International Application No. PCT/EP2016/072803 dated Dec. 14, 2016; 4 pages.
Written Opinion of the International Searching Authority for corresponding International Application No. PCT/EP2016/072803 dated Dec. 14, 2016; 7 pages.
Martin Sauer: "Wireless Local Area Network (WLAN)" In: Communication Systems for the Mobile Information Society, Jul. 14, 2006 (Jul. 14, 2006), John Wiley & Sons, Ltd., Chichester, UK, XP0155140319, ISBN: 978-0-47-003320-3 pp. 217-248 (32 pages total), DOI: 10.1002/9780470033210.ch4.

* cited by examiner

ACCESS POINT GROUPING BASED ON PERFORMANCE AND LOCATION

CROSS-REFERENCE TO RELATED APPLICATIONS

The present application is a National Phase entry of PCT Application No. PCT/GB2015/050907, filed on 26 Mar. 2015, which claims priority to EP Patent Application No. 14175108.1, filed on 30 Jun. 2014, and which also claims priority to EP Patent Application No. 14250060.2, filed on 31 Mar. 2014, and which also claims priority to EP Patent Application No. 14250061.0, filed on 31 Mar. 2014, all of which are hereby fully incorporated herein by reference.

TECHNICAL FIELD

The present disclosure relates to data communications and in particular to a method and system for detecting home network problems.

BACKGROUND

In order to access wide area networks such as the Internet, customers at home and commercial premises use a broadband network between the customer premises and an Internet Service Provider (ISP) such as the BT Total Broadband service offered by British Telecommunications plc.

Typically, the customer premises is connected to the ISP equipment via a copper line, a combination of copper and optical fiber lines or optical fiber lines. Examples of such arrangements include Asymmetric Digital Subscriber Line (ADSL), Very High Speed Digital Subscriber Line (VDSL) (collectively referred to as xDSL), Fiber-to-the Cabinet (FTTC), Fiber to the Premises (FTTP) and Data over Cable Service Interface Specification (DOCSIS).

The broadband connection links the customer to services available on wide area networks such as the Internet thereafter to a wide range of remotely located application servers and services.

In the case of a DSL broadband network, the ISP has equipment located at an exchange building servicing multiple premises, and data from the wide area network is routed to the customer via a Digital Subscriber Line Access Multiplexer (DSLAM) or mini DSLAM.

At the user premises, a modem converts the broadband/DSL signal into a home network format such as Ethernet and a router then provides routing capability so that multiple home network devices such as computers, laptops, tablets and phones can share the bandwidth of the connection.

To accommodate device mobility, a wireless access point distributes the Ethernet packets over an air interface, typically in accordance with the IEEE 802.11 family of protocols. These are commonly referred to as Wi-Fi. At present the latest standard is 802.11ac while 802.11n, 802.11g and 802.11b are still common. Using Wi-Fi, wireless devices can send data to and receive data from local and remote services via the access point.

Typically the modem, router and wireless access point functions are integrated into the same physical unit. Examples are the BT Home Hub 4 which combines an ADSL modem, router and 802.11n access point, and the BT Home Hub 5 which combines a VDSL modem, router and 802.11ac access point. These combined devices will now be referred to as Hubs.

Due to the regulation of radio spectrum across the World, Wi-Fi only operates within the 2.4 GHz and 5 GHz spectrum bands. Being an air interface, the performance of Wi-Fi is susceptible to external influence. There are a number of factors which can influence the performance of the link between a wireless device and the wireless access point part of a hub:

Relative Location: The quality of the signal link deteriorates as the distance between the devices increases;

Obstructions: The presence of objects in the path between the device and the access point also deteriorate the signal link. The composition of the object also has an effect. Metals reflect the radio waves while brick and concrete absorb the radio waves;

Shared channel: The number of channels available for transmission is limited. In 2.4 GHz Wi-Fi there are typically only 13 channels and of those only 3 are non-overlapping. Therefore access points typically choose to broadcast on channels 1, 6 and 11. Where two or more access points have their wireless networks on the same channel, in accordance with the Carrier Sense Multiple Access with Collision Avoidance (CSMA-CA) protocol, if a device is transmitting, no other device can transmit. Any device wishing to transmit must wait for the currently transmitting device to finish before it attempts to gain the channel. If a device is waiting a long period of time to transmit due to heavy channel usage, performance suffers. Therefore in areas with a dense population of Wi-Fi access points is present, the system performance will deteriorate;

Adjacent channel: The RF channels used in Wi-Fi are not sufficiently spaced so that adjacent channels are completely isolated from each other. The energy of transmissions in a particular channel is also present in the adjacent 3 channels on either side of the channel. Therefore to avoid cross talk it is recommended to use channels 1, 6 and 11 to provide sufficient isolation. However, a device on a particular channel wishing to transmit, may be prevented from doing so due to a device operating on an adjacent channel due to the behavior of the CSMA-CA protocol. Similarly when the device is transmitting, it will prevent devices on adjacent channels from transmitting. Therefore this behavior results in congestion;

Other wireless protocols: The radio frequencies used by Wi-Fi devices, especially the 2.4 GHz bands, are not exclusively used by Wi-Fi. Other wireless protocol devices such as Bluetooth and wireless microphones also operate in these bands. These devices can cause disruption to multiple Wi-Fi devices in the form of interference since they do not comply with the CSMA-CA protocols; and Out of band—Just as the energy from an adjacent Wi-Fi channel transmission can leak into a neighboring channel, devices operating in a different but adjacent part of the radio frequency spectrum can cause interference. Examples are LTE transmissions in the 2.6 GHz spectrum.

There are therefore two main physical links in the communication path between a user device and the ISP equipment which can affect the user's quality of experience with the ISP. Namely, the DSL link from the DSLAM to the customer modem, and the Wi-Fi link between the user's devices and the access point.

A bottleneck at either location will negatively affect the user's experience. However, typically, when a user experiences poor performance, the assumption is that the DSL link is the problem and a complaint is made to the ISP or access provider.

While the DSL link is also susceptible to performance problems and interference, those are beyond the scope of this disclosure. The present disclosure relates to the increasing likelihood of problems occurring on the air interface due to both contention as the number and density of wireless access points increases as well as the potential for interference from a variety of sources.

SUMMARY

In one aspect the present disclosure provides a method for monitoring the performance of a plurality of wireless networks created by a plurality of wireless access points, comprising: receiving performance data from the plurality of wireless access points; analyzing the performance data to identify any wireless access points which are experiencing wireless network performance degradation; identifying the location of each wireless access point; grouping by regions of location the wireless access points which are experiencing wireless network performance degradation; and for each group, determining the cause of the wireless network performance degradation.

In another aspect the present disclosure provides apparatus for monitoring the performance of a plurality of wireless networks created by a plurality of wireless access points, comprising: means for receiving performance data from the plurality of wireless access points; means for analyzing the performance data to identify any wireless access points which are experiencing wireless network performance degradation; means for identifying the location of each wireless access point; means for grouping by regions of location the wireless access points which are experiencing wireless network performance degradation; and means for determining the cause of the wireless network performance degradation in each region.

BRIEF DESCRIPTION OF THE DRAWINGS

Embodiments of the present disclosure will now be described with the aid of the accompanying Figures in which.

DETAILED DESCRIPTION

Figure 1:
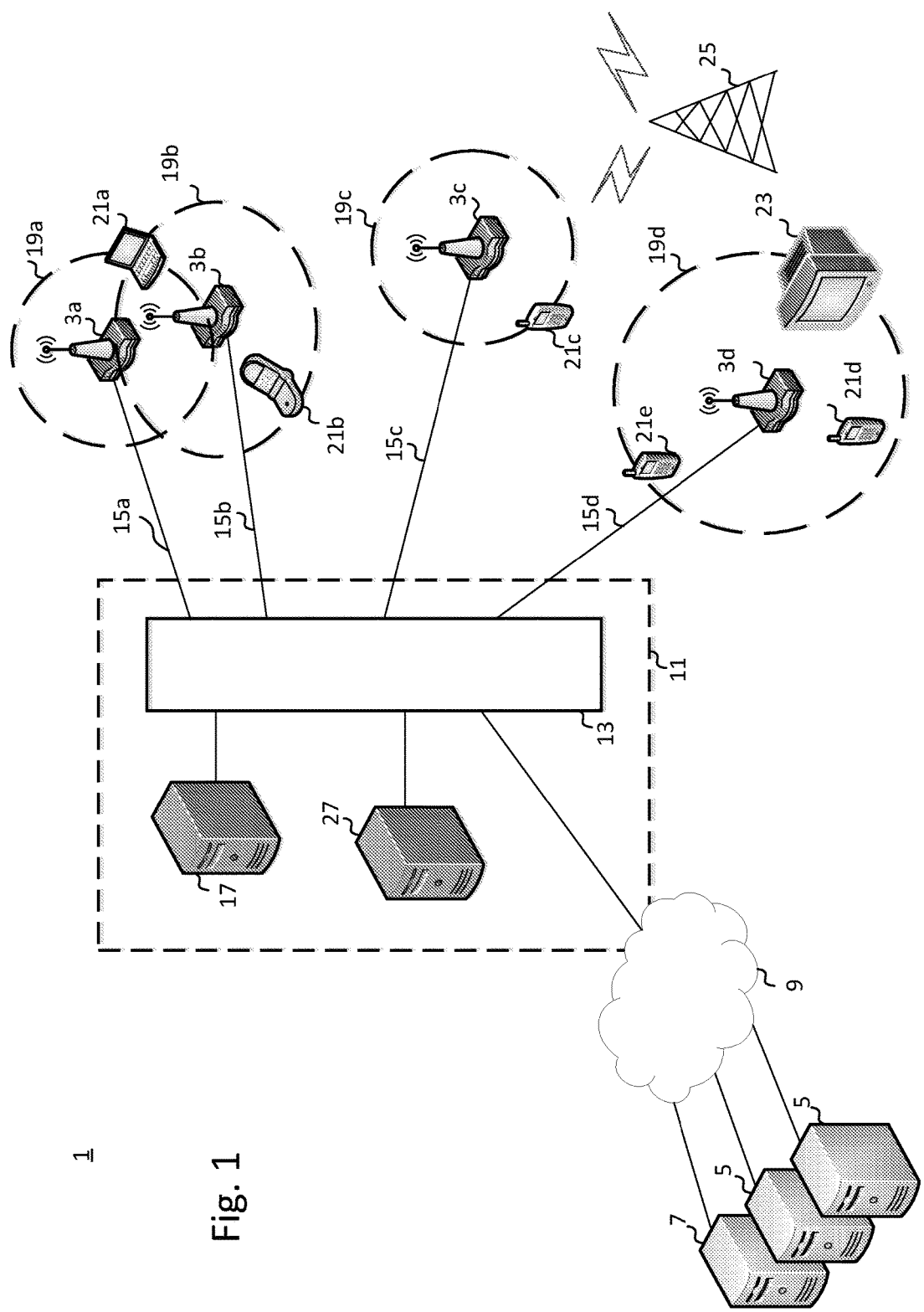
FIG. 1 shows the main components of a network in accordance with the first embodiment of the disclosure.

FIG. 1 shows the main components of a network 1 according to a first embodiment. In this system, a number of hubs 3 are shown located at a number of customer premises. Each hub 3 contains modem, routing and wireless access point functionality. The modem component converts DSL signaling into Ethernet, the routing directs the flow of Ethernet packets to the different network interfaces and the wireless access point components converts the Ethernet data into a format suitable for transmission over the air interface. An example of a hub device 3 is the BT Home Hub 5 having a VDSL modem and 802.11ac wireless interface.

Each hub 3 is connected to application servers 5 and web servers 7 located on a wide area network such as the Internet 9, via the ISP's network core 11. In order to access the network core 11, edge routers 13 such as DSLAMs and mini DSLAMs are connected to the hubs via a DSL copper or fiber line 15. A user profile server 17 stores information relating to each customer and the line 15 properties.

As is conventional for wireless access point devices, the hubs 3 each generate a wireless network 19 (WLAN) and devices 21 such as laptops, smartphones and tablets within communication range of the wireless signal, and having the authentication credentials, can connect to the hub 3 to send and receive data sessions in accordance with the IEEE 802.11 family of Wi-Fi protocols.

Therefore in the above network configuration, for any communication session between a user device 21 and an application server 5 or web server 7, data packets generated at the user device 21 must traverse several physical layer transmission mediums before reaching the remote device, application server 5 or web server 7. Namely:

1. Device 21 to hub 3—data is transmitted over the air medium in accordance with the IEEE 802.11 Wi-Fi protocols;
2. Hub 3 to ISP core 11—with the aid of a suitable modem, data is transmitted using a DSL protocol over copper lines 15;
3. Copper to optical link—used from the DSLAM/mini DSLAM to other network core components and communication paths for general routing towards the destination. Electrical signals will be converted to optical signals within backhaul and core network components.

The 802.11ac protocol allows a maximum speed of 1300 Mbps between devices, 802.11n allows a maximum speed of 600 Mbps and 802.11g allows a maximum speed of 54 Mbps. However, in all three variants, the maximum speed is rarely achieved due to the number of issues affecting Wi-Fi. As explained above, poor performance of the Wi-Fi link can be caused by various forms of contention and interference affecting the spectrum used by Wi-Fi. Examples are other neighboring Wi-Fi devices and access points on the same channel, access points on an overlapping channel, Bluetooth, and wireless microphones. In addition, interference from devices such as microwave ovens, some cellular devices such as 2.6 GHz Long Term Evolution (LTE) devices and electrical storms can disrupt Wi-Fi.

DSL speeds are generally slower than Wi-Fi speeds and are dependent on the particular type of DSL used in the link between the customer premises and the ISP equipment. The maximum theoretical speeds are 8 Mbps for ADSL 1, 24 Mbps for ADSL 2+, 160 Mbps for VDSL FTTC, 330 Mbps for FTTC. Factors that affect the performance of the DSL link include length of the line, crosstalk between lines, electrical faults at the mini DSLAM within the power grid and accidental damage to the lines due to cable works.

Due to the large differences in maximum speed between Wi-Fi and DSL links, generally any loss in performance is blamed on the DSL link and a complaint is made to the ISP.

However the likelihood of the problem actually occurring in the Wi-Fi part of the communication link is significant.

Examples of the different problematic scenarios are shown in FIG. 1.
1. Contention in a shared channel. In this case, the DSL connection from hub 3a to the DSLAM 13 is functioning correctly over line 15a and the DSL connection from hub 3b to the DSLAM 13 is also functioning correctly over line 15b.
    a. Hub 3a and hub 3b are in close proximity and therefore their wireless networks 21a and 21b respectively overlap in geographical range. A phone 21b is connected to network 21b in the non-overlapping range but may suffer slightly deteriorated performance due to the hub 3b being unable to respond to requests due to lockout by the CSMA-CA transmission scheme.
    b. A laptop 21a is shown in the overlapping range between the wireless networks 19a and 19b and therefore its connection to hub 21a will be affected by the signal from hub 21b and the need to wait before transmitting in accordance with CSMA-CA.
2. Poor DSL line. In this case, there are no issues with the hub 3c or the wireless network 19c connection to a mobile device 21c. However, the DSL link 15c is suffering due to a line fault.
3. Interference—In this case there are no problems with the DSL line 15d and there are no Wi-Fi related problems in the wireless network 19d to the phone 21d. However, a microwave oven 23 is generating interference which affects the network.

Most of the causes of interference are short range sources, however, a LTE radio transmitter 25 is also shown which can be a source of wide area interference affecting multiple wireless networks.

Figure 2:
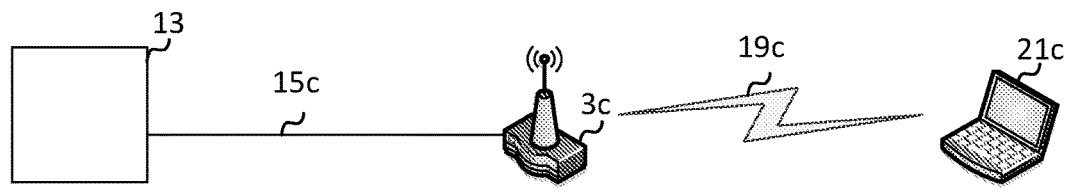
FIG. 2 shows a scenario in which problems on a DSL line on data sessions also affect the wireless link between a device and a hub.
Figure 2:
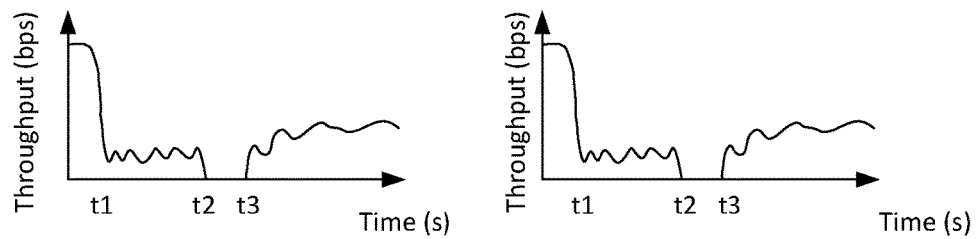
Figure 3:
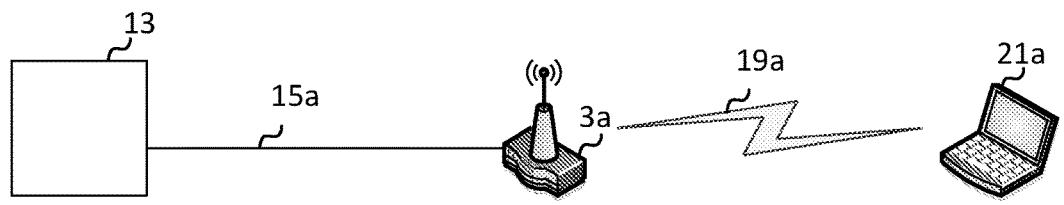
FIG. 3 shows a scenario in which the wireless network is affected by interference.
Figure 3:
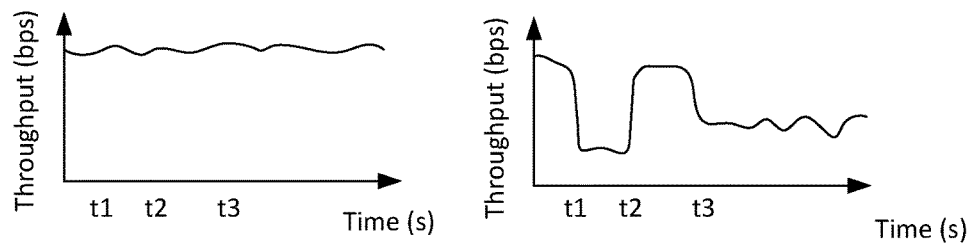
Figure 4:
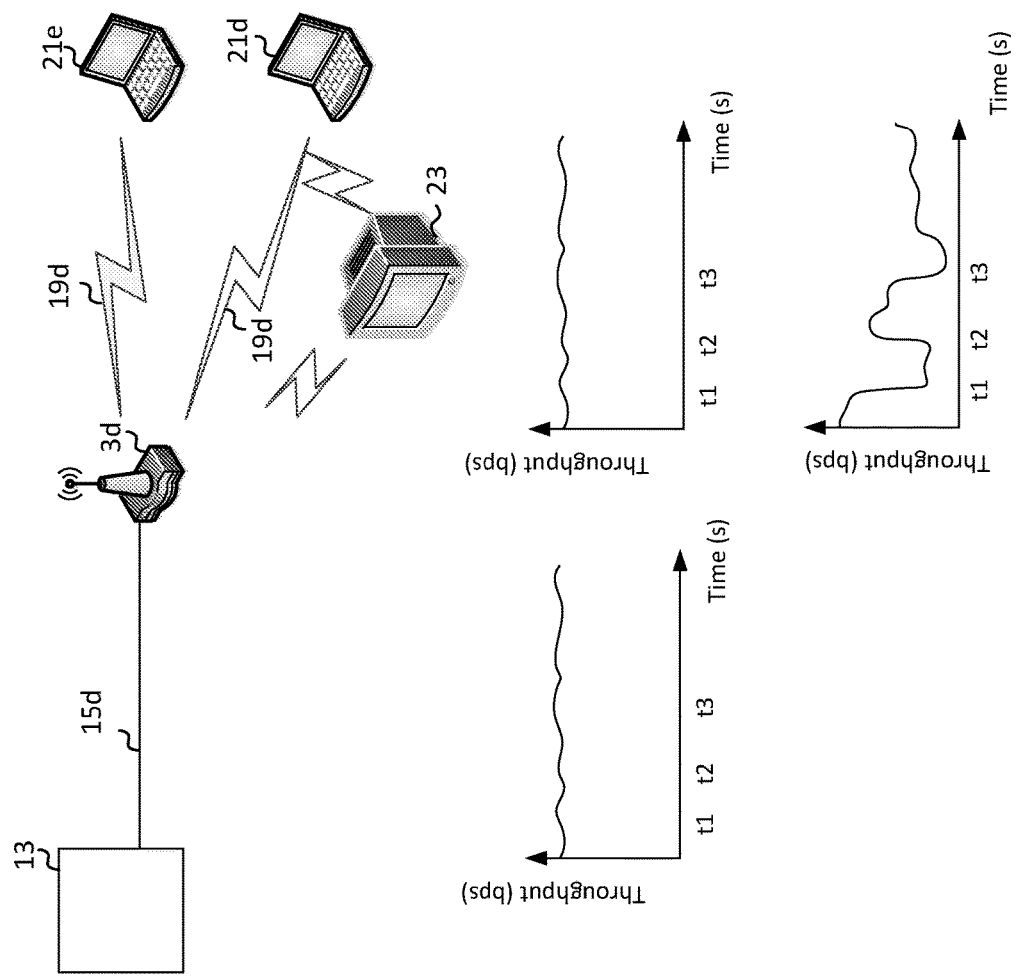
FIG. 4 shows a scenario in which a particular wireless link between a wireless device and the hub is affected by interference.

FIGS. 2 to 4 show the different network performance characteristics that can be observed when a device is communicating with a remote application server and a fault occurs on each of the communication links.

As shown in FIG. 2, when a fault occurs on the DSL line 15c such as a disconnection or a drop in throughput, the performance of the Wi-Fi network 19c link matches this degradation since the flow of data is restricted between the user device 21c and the application server 5 via the DSL connection 15c. Furthermore, this fault can be detected at the ISP since the modem will synchronize with the DSLAM at a new rate which will be logged and stored at the DSLAM.

In a case where there is a fault in the DSL connection, this fault can be detected by the ISP and taken into account when estimating the speed of service a customer can expect to receive. For example, although the maximum theoretical speed of ADSL2+ is 24 Mbps, the ISP can factor in conditions that may be affecting the user's DSL line to estimate the likely speed to be 15 Mbps.

However, a more difficult situation for the ISP to resolve is where the customer has paid for a level of service, for example the ADSL2+ product with an estimate of 15 Mbps but then finds that their connection to certain services is poor, or where they carry out a speed test and find that the calculated speed between their device and the remote speed test service is significantly below this estimated speed.

In this case, the poor performance may be due to the customer's network setup and more specifically the user's Wi-Fi environment. However, generally the ISP has no visibility of the customer's setup.

FIG. 3 shows the throughput of a data session between a user device 21a and a remote server 5 over time in a case where the Wi-Fi 19a link deteriorates while the DSL link 15a remains stable. As can be seen, initially the performance of the Wi-Fi network 19a is sufficient to saturate the DSL link 15a so that the DSL link 15a is the bottleneck. However, after time t1 the throughput of the Wi-Fi network 19a drops, perhaps due to contention or interference, but this does not affect the DSL link 15a. At time t2 the cause of performance degradation is removed and as the Wi-Fi network 19a performance increases, until the DSL link 15a is again the bottleneck. In this example, at time t3, the Wi-Fi network 19a performance drops and remains low. If the performance loss is sustained, the customer would typically call to complain to the ISP.

In this case, the performance of the Wi-Fi network 19a is affecting the customer's data sessions.

FIG. 4 shows a case where a local source of interference 23 is affecting one of the devices 21d located on a Wi-Fi network 19d but other Wi-Fi devices 21e are not affected. In this case, the throughput of device 21e remains constant while the throughput of device 21d falls dramatically in the presence of interference 23 before returning to the previous speed. The DSL line 15d speed does not change.

In FIGS. 3 and 4, degradation of the wireless network 19a, 19d link between at least one device 21a, 21d and the wireless access point part of the hub 3a, 3d caused a user's data sessions to be negatively affected while performance of the DSL link 15a, 15d did not change.

In a conventional network setup, the ISP has no visibility of the above scenarios. Therefore in the first embodiment, the hub is arranged to try to identify these situations. Furthermore, a Wi-Fi management server 27, located in the ISP network core 11, is provided to configure the hubs 3 in the customer premises and perform further analysis on the information collected by each hub 3.

The hub 3 and management server 27 of the first embodiment will now be described in more detail.

Figure 5:
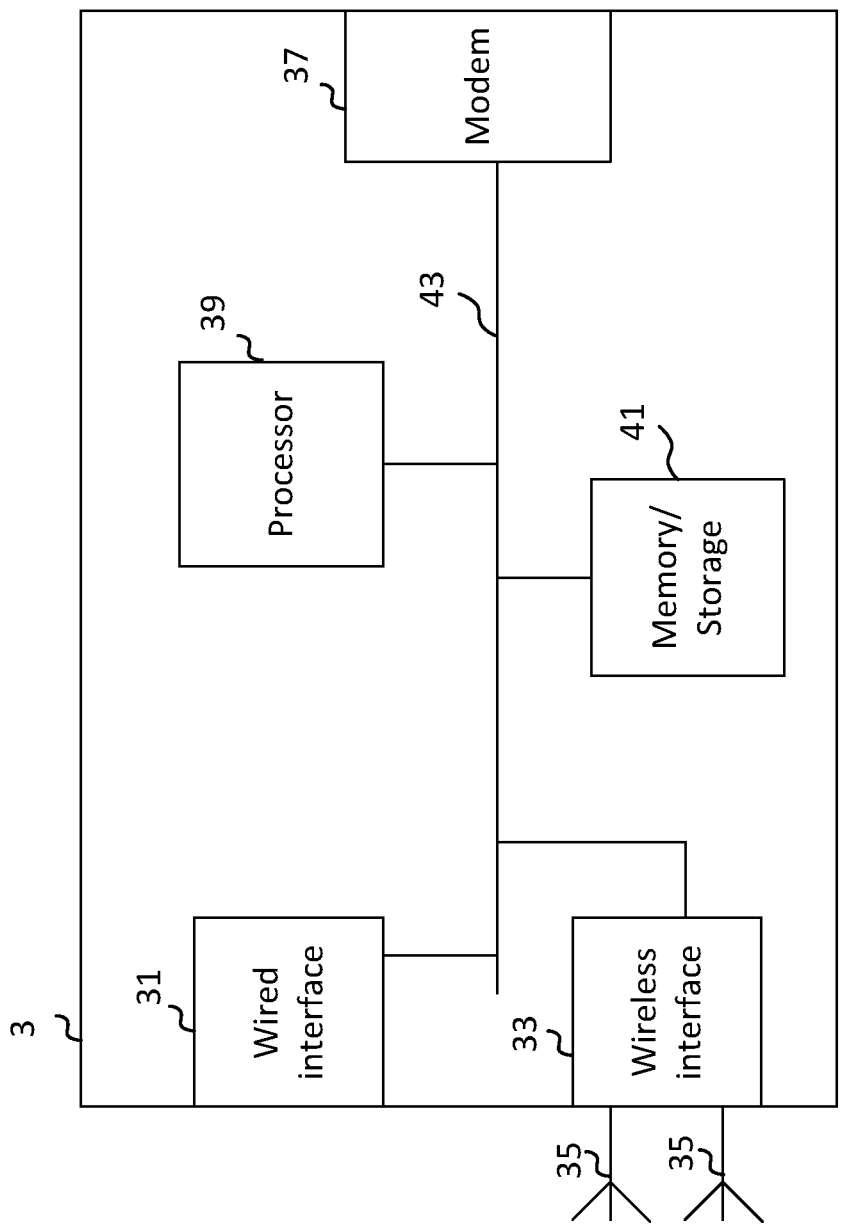
FIG. 5 shows the components of a hub in the first embodiment.

FIG. 5 shows the main components of the hub 3 according to the first embodiment. For home network connections, the hub 3 has a wired network interface 31 and a wireless networking interface 33, in this case four gigabit Ethernet ports and an IEEE 802.11ac Wi-Fi adaptor and antenna array 35. For connections to remote networks, the hub 3 has a wide area network interface 37 in the case of the BT home hub 5, a VDSL2 modem to connect to the ISP network core 11 over a copper 15 and fiber optic line in accordance with FTTC/FTTP DSL.

A central processor 39 controls the flow of packets from and to the various ports via a storage medium 41 which includes random access memory (RAM), Read Only Memory (ROM) and processor buffers. The various components are communicatively connected via a common data bus 43.

The central processor 39 manages the hub 3 in accordance with program instructions stored on the storage medium 41.

When the central processor 39 is executing the program instructions the hub 3 can be regarded as a number of functional component blocks as will be described in the next section.

Figure 6:
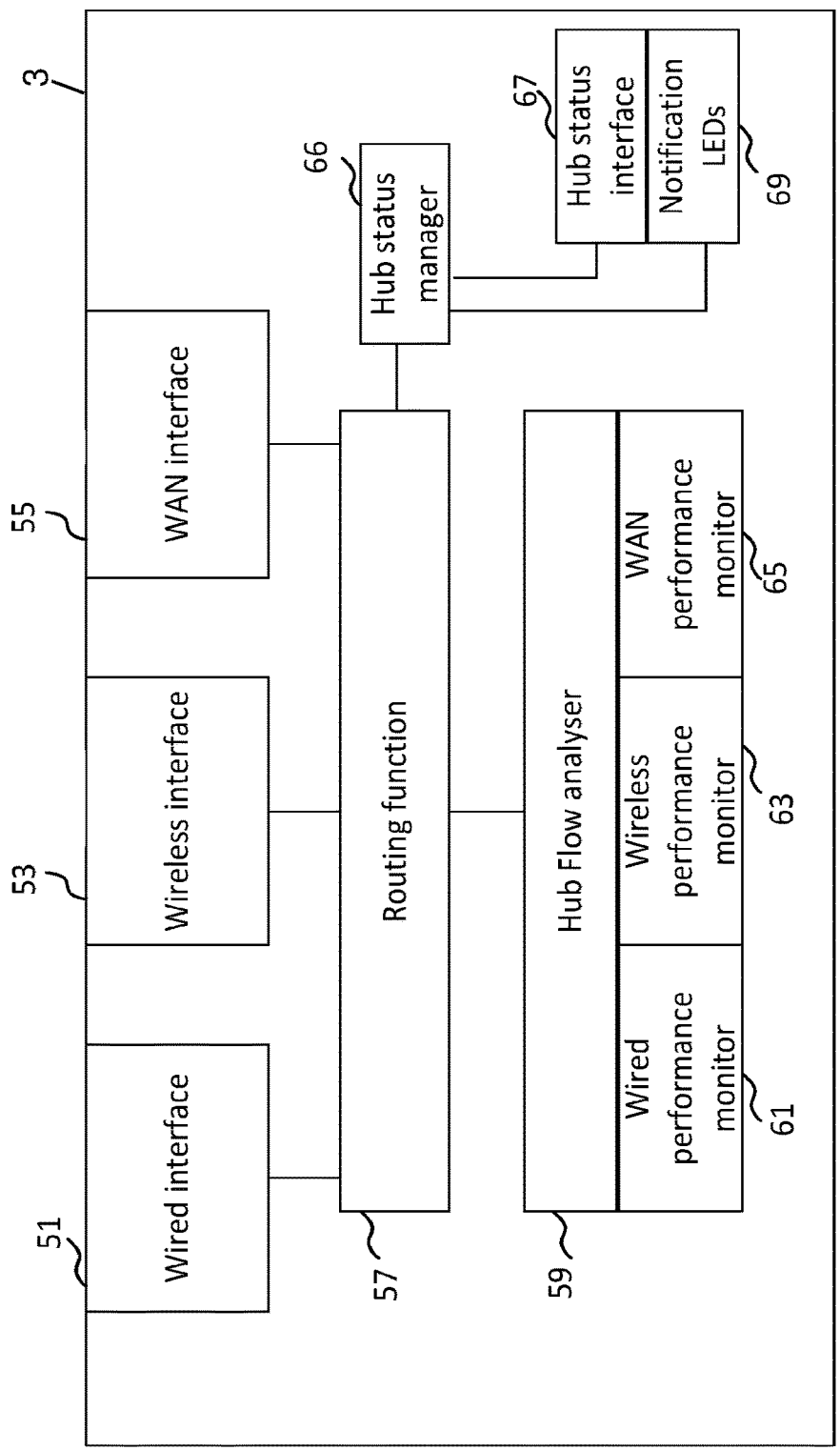
FIG. 6 shows the functional components of the hub in the first embodiment.

FIG. 6 shows the functional components of a hub 3 in the first embodiment.

For external connectivity, the hub contains a wired LAN interface 51, a wireless network interface 53 and a wide area network interface 55 for connecting to the respective wired, wireless and remote devices.

As will be described in more detail later, a routing function 57 handles the routing of packets between the different interfaces 51, 53, 55 in accordance with the packet destination. The typical routing paths to the Internet are:

Wireless to WAN;
WAN to Wireless;
Ethernet to WAN; and
WAN to Ethernet.

There are also home network communication paths:

Wireless to Wireless—communication between two wireless home network devices 21;
Ethernet to Ethernet—communication between two wired home network devices;
Wireless to Ethernet—communication from a wireless home network device 21 to a wired home network device; and
Ethernet to Wireless—communication from a wired home network device to a wireless home network device 21.

Furthermore, for administrative activities, devices on any of the network interfaces 51, 53, 55 may communicate with the hub itself. Therefore three further paths are:

Wireless to Hub 3;
Ethernet to hub 3; and
WAN interface to hub 3.

To identify Wi-Fi problems, in this embodiment, the routing function 57 is configured to look at data traffic flowing over the wireless interface 53 while generally ignoring traffic which is flowing only between the other interfaces 51, 53.

As will be described in more detail below, the hub 3 includes a hub flow analyzer 59 for analyzing data packets in terms of IP Flows flowing through the wireless network interface 53. The routing function 57 is configured to replicate wireless network packets which are received from the wireless interface 53 or being sent to the wireless interface 51 to the hub flow analyzer 59 and the hub flow analyzer 59 identifies potentially problematic flows for further analysis by the wireless management server 27.

Additionally, the hub 3 contains a wired LAN performance monitor 61, a Wi-Fi performance monitor 63 and a WAN performance monitor 65 to collect performance metrics relating to each of the interfaces 51, 53, 55. This information is used by the hub flow analyzer 59 in processing the flow records.

Finally, the hub 3 also contains a hub status manager 66 for receiving information about the status of the wireless network from the hub flow analyzer 59 in accordance with instructions from the management server 27. To communicate any determination of interference on the wireless network, the hub contains a user interface 67 for users to access status information about the hub, including any information relating to any detected Wi-Fi interference and the hub 3 includes notification lights 69 for providing visual indications to the user that problems affecting the performance of the wireless network have been detected.

Routing

Figure 7:
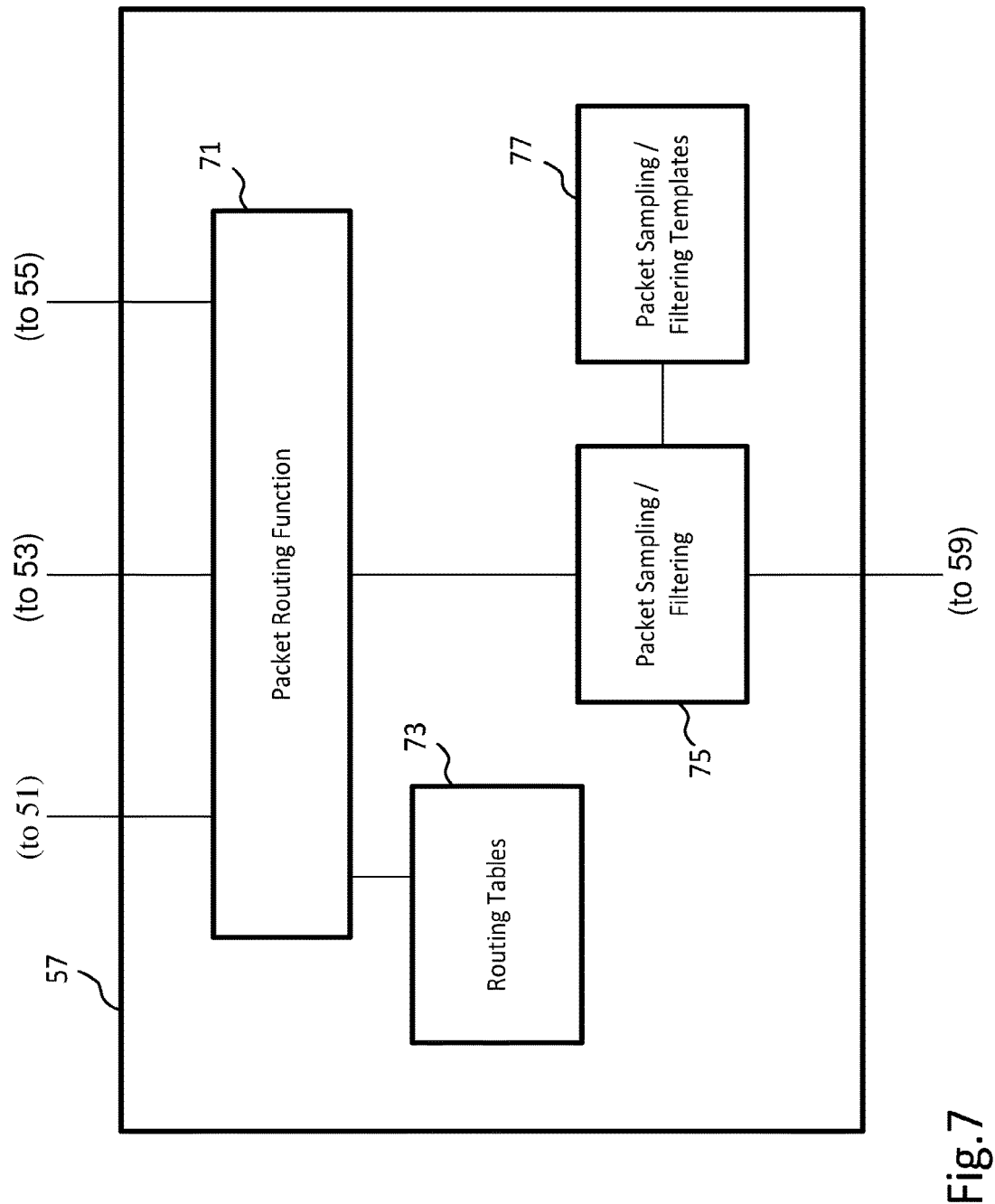
FIG. 7 shows the components of a routing function within the hub.

FIG. 7 shows the components of the routing function 57 in more detail.

A packet router 71 performs the standard packet routing in accordance with rules in a routing table(s) 73. Data packets entering any of the wireless network interface 53, wired network interface 51 and wide area network interface 55 are routed to the correct interface in accordance with each packet's destination. The routing table 73 contains information relating to the location of each device 21 (identified by its MAC address and assigned IP address) connected to the local side of the hub 3 and the appropriate interface 51, 53, 55 that will enable a packet to reach the destination.

An example routing table 73 is shown below.
Device to IP Address table
Dev 1 (phone) MAC address 1—192.168.1.10—Wireless
Dev 2 (tablet) MAC address 2—192.168.1.20—Wireless
Dev 3 (laptop) MAC address 3—192.168.1.30—Wireless
Dev 4 (desktop) MAC address 4—192.168.1.40—Ethernet
Other device—other—WAN In order to isolate the wireless network data packets, a packet sampling and filtering function 75 is configured to inspect the data packets and flowing via the packet router 71 and replicate only packets received from the wireless interface 53 or being directed to the wireless interface 53 to the hub flow analyzer 59. The sampling and filtering is performed in accordance with packet sampling and filtering templates stored in packet sampling and filtering templates store 77. These templates are provided by the management server 27 at boot time and specify which packets are replicated, for example whether all wireless data packets are replicated, only the outbound packets received from the wireless interface 53, etc. Furthermore the management server may send updated templates to change the reporting behavior of the hub 3.

In this embodiment, the packet sampling and filtering function 75 also sends radiotap headers to the hub flow analyzer 59. These headers are populated with information relating to the currently observed physical Wi-Fi link conditions such as modulation rate. The hub flow analyzer 59 also records additional information related to the physical link (such as packet retry rates) retrieved from the Wi-Fi performance monitor 63 and relates it to the relevant flows.

Hub Flow Analyzer 59

Figure 8:
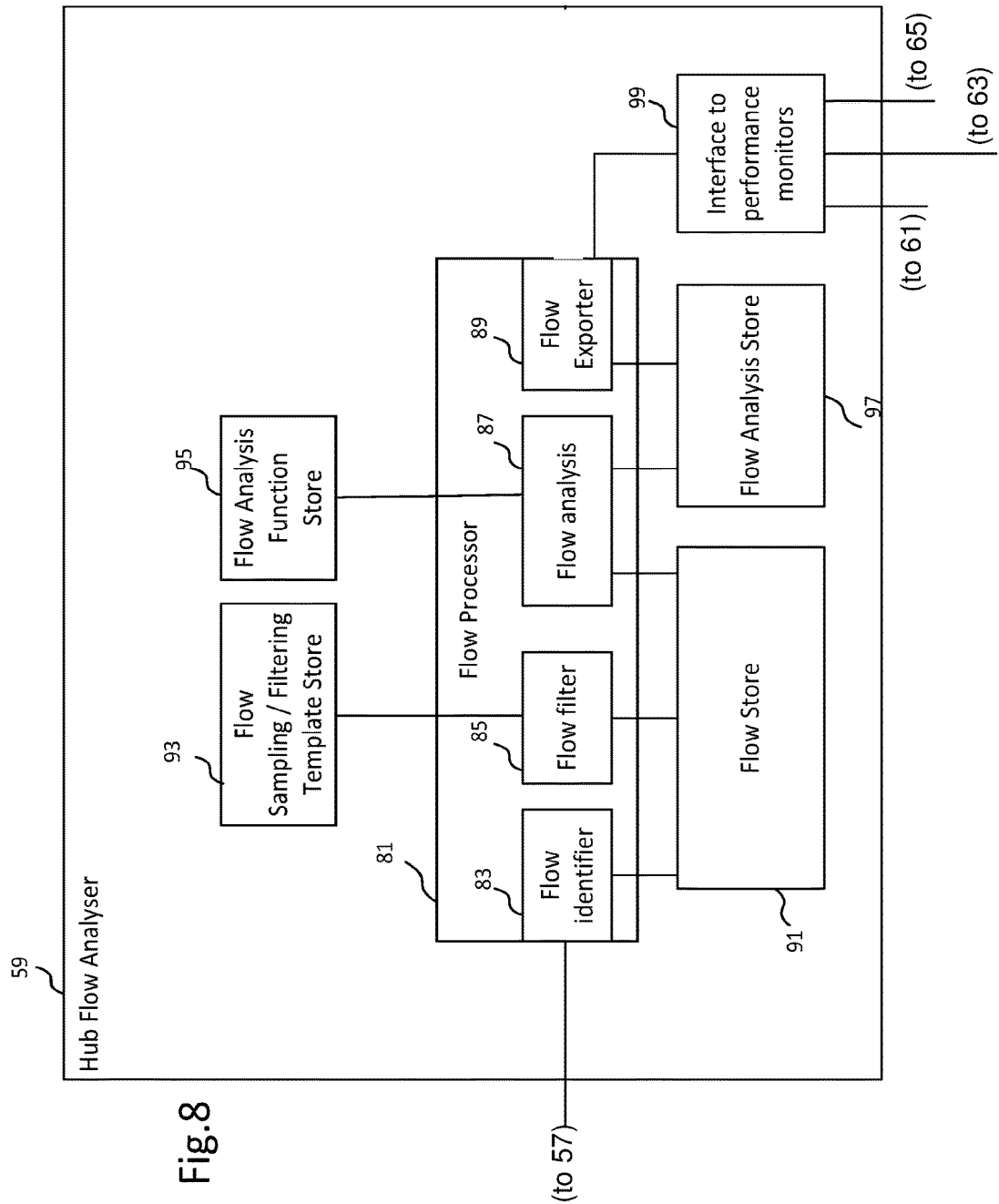
FIG. 8 shows the components of a hub flow analyzer within the hub.

FIG. 8 shows the components of the hub flow analyzer 59. The hub flow analyzer 59 is responsible for grouping the data packets replicated by the packet sampling/filtering function 75, in this case packets flowing via the wireless interface 53 and preparing information about the groups for transmission to the management server 27.

In this embodiment, the hub flow analyzer 59 works with IP Flows. IP Flows are sets of data packets having the same n-tuple of source address, source port, destination address, destination port and protocol, representing a logical flow of data from one device to another and may represent particular data sessions, such as a VOIP call or gaming session. Degradation in these kinds of services would generally be noticeable to a user.

A flow processor 81 analyses the received data packets in a number of stages. The stages include a flow identifier function 83, a flow filter function 85, a flow analysis function 87 and a flow export function 89.

As packets arrive from the packet sampling/filter function 75, in the first stage, the flow identifier function 83 uses standard flow analysis techniques to create/update a set of flow records and stores them in a flow store 91.

An example set of flows stored in the flow store 83 is shown.

| Flow ID | Source Add | Source Port | Destination Add | Destination Port | Protocol |
|---|---|---|---|---|---|
| 1 | Dev 1 | 8080 | 173.194.41.166 | 2525 | TCP |
| 2 | Dev 2 | 24242 | 10.142.14.82 | 1573 | UDP |
| 3 | Dev 1 | 35167 | 173.194.41.160 | 37378 | TCP |
| 4 | Dev 3 | 11578 | 248.192.25.10 | 1825 | TCP |

Sending data about these flows would provide the management server with information about the type of data traffic generated by the user devices connected to the hub and data analysis could determine congestion information. However, as the number of hubs to be analyzed increases, if every hub sends all flow information to the wireless management server 27 there would be a large processing burden.

Furthermore, when there are no connectivity problems, sending the flow records for healthy flows will waste resources. Therefore in this embodiment, the hubs are configured by the wireless management server to identify and filter the possible flow records so that only potentially problematic flows are sent to the wireless management server 27, together with a small subset of the healthy flows.

Once the set of flows being carried across the wireless interface 53 have been identified, the flow filter function 85 of the flow processor 81 compares the flows stored in the flow store 83 against a set of export rules defined in the Flow sampling/filtering template store 93. These rules are provided by the management server 27 at start-up time and may be updated by the management server 27 as required.

The aim of the filtering is to pick out flows which the management server 27 has determined to be sensitive to contention or interference. Generally these are high bandwidth or low latency tasks in which degraded performance would be noticed by the user and perceived to be due to a bottleneck in the network.

An example of the types of rule stored in the flow sampling/filtering template store 95 is shown below.

| Field | Selection Criteria | Action | Comment |
|---|---|---|---|
| IP address | Address in the following set: 173.194.41.160 to 173.194.41.169 173.194.41.174 | Mark for export | Select traffic to or from YouTube |
| Ingress/Egress Interface | WLAN | | Only look at traffic traversing the WLAN |

As a result of this comparison, only some of the flow records are selected. In this case, only flows 1 and 3 would be processed further since they match the above rule.

The above rule is for locating flows which should be exported to the management server 27. In marking them for export, two other rules are available in this embodiment. "Immediate discard" is where flows are ignored for further processing, and "post-analysis discard" where flows are to be processed by the later flow analysis functions, but aren't subsequently exported.

Once flows have been identified for further analysis, the properties of the packets within those identified flows together with supplementary information from the interface performance monitors will be analyzed to create the flow record. To further reduce the processing burden, the packets can be sampled. In this embodiment a 1 in 10 sampling criteria is used, however any standard sampling criteria is envisaged, for example, random x % of packets, a hash match, etc.

Flow Analysis

The sampled and selected flows in the flow store 91 are also analyzed by the flow analysis function 87 of the flow processor 81 to generate flow records in accordance with functions stored in the flow analysis function store 95. The functions are provided by the management server 27. The results of the analysis are stored in flow analysis store 97.

There are two types of function in the flow analysis function store 95.
- Type 1—These are functions that are executed on each newly completed/identified flow as it is added to the flow store by the flow identifier;
- Type 2—these functions are executed periodically (for example every few minutes) and typically will process multiple flow records together with inputs from the three performance monitors (the wireless LAN monitor 63, the wired LAN monitor 61 and the WAN monitor 65) via performance monitor interface 99.

The results of the either of these types of processing can result in two kinds of output:
- A flow record or set of flow records are tagged with additional attributes and/or are tagged for export of discard. These supplemented flow records are stored in the Flow Analysis Store.
- Overall statistics or analyses are generated which do not necessarily correspond to a single flow (e.g. average throughput for a particular device; counts of failed flows for a particular device; total wireless network throughput). These latter analysis results are stored in the aggregate statistics store.

Pseudo code examples of the functions are set out below.
Example of Type 1 function in pseudo code:

```
# Example designed to keep track of the number of flows with
# slow physical link transmission
if (currentFlowRecord.physicalRate<5) {
    aggregate Stats.slowFlowCount++;
}
```

Another example of Type 1 function in pseudo code:

```
# Example designed to keep track of the number of flows with
# slow physical link transmission and high retry rates
# on an overall and per client basis
# Also make sure the flow record is exported.
if (currentFlowRecord.physicalRate<5 &&
currentFlowRecord.retryRate>50) {
    aggregateStats.timeslot[now].slowFlowCount++;
    aggregateStats.clients[flowRecord.phySourceAddr].
      timeslot[now].slowFlowCount++;
    currentFlowRecord.exportStatus=EXPORT;
}
```

Example of Type 2 function in pseudo code:

```
# Example designed to detect Wi-Fi physical channel congestion
# using info from WLAN Performance Monitor
    if (wlanPerformanceMonitor.getAvgChannelLoad( )>0.8) {
        aggregateStats.timeslot[now].congested=true;
    } else
    {
        aggregateStats.timeslot[now].congested=false;
    }
```

Another simplified example of Type 2 function in pseudo code:

```
# Example designed to detect specific devices which cannot successfully
open tcp connections as being devices attached to public side of AP
but not logged in.
    foreach (flowRecord in timeslot[now].flowRecords) {
        aggregateStats.clients[flowRecord.phySourceAddress].
        timeslot[now].
        numOutboundFlows++;
```

-continued

```
        if (flowRecord.isOutboundSynOnly( )) {
            aggregateStats.clients[flowRecord.phySourceAddr].
            timeslot[now].
            numSynOnlyFlows++;
        }
    }
    foreach(client in aggregateStats.clients) {
        if((client.timeslot[now].numSynOnlyFlows /
            client.timeslot[now].numOutboundFlows) > 0.7) {
                client.timeslot[now].notLoggedIn=true;
                client.timeslot[now].exportStatus=true;
        } else {
                client.timeslot[now].notLoggedIn=false;
                client.timeslot[now].exportStatus=false;
        }
    }
}
```

Flow Export

Having generated the flow records and statistics, the flow exporter function 89 of the flow processor 81 is arranged to periodically export the flow records which are marked for export to the management server 27 and then deletes any records which are explicitly marked for deletion. Other flows which are only marked for export are retained in the flow analysis store 97 until they are older than a predetermined age threshold.

In this embodiment, the data is transferred in the form of an IP Flow report using the IP Flow Information Export (IPFIX) IETF protocol. Details of IPFIX can be found at https://tools.ietf.org/wg/ipfix/.

In addition to flow records, the flow exporter 89 also exports the aggregate statistics relating to the flows marked for export over the same interval to the management server 27. The flow records and aggregate statistics contain a unique identifier for the hub 3 so that the management server 27 can return information to the hub 3.

If a response from the management server 27 is received on the WAN interface 55, the routing function 57 directs the packets to the hub status manager 66 which then causes the WLAN status lights 69 to activate in a manner which indicates to the user whether there are any detected problems on the Wi-Fi network 19.

In this embodiment, the LED 69 can flash different colors to indicate different severity levels, for example green if there is no problem, orange if there is mild or short term performance degradation, red if there is a major problem. Furthermore, if the management server 27 determines only a subset of the connected devices 21 are affected, the notification light 69 can flash in a pattern and/or in a manner to indicate how many devices are affected.

Furthermore, the hub status manager 66 will update a hub status page accessible to the user via a user interface to provide more detailed fault information such as identifying the extent of the fault and also which specific devices are affected.

Components of the Management Server

In this embodiment each hub connected to the ISP network core 11 is arranged to send information relating the data sessions flowing over its wireless network to the management server 27. The management server 27 is responsible for processing the flow records exported by the hubs 3 and for each hub to identify whether there is a problem with that hub's Wi-Fi network. If congestion, interference or any other sort of degradation is detected, that hub is informed and the fault information can then be stored on the ISPs customer database so that the ISP is aware of the problem.

Figure 9:
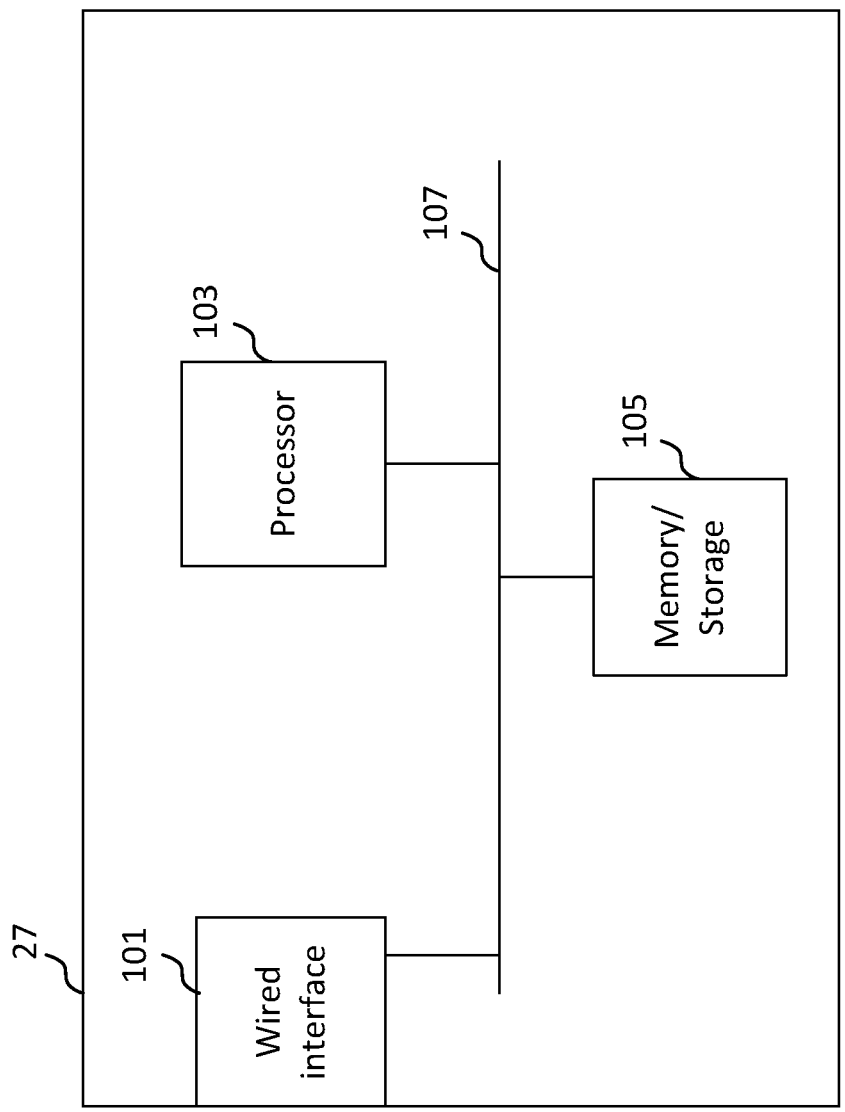
FIG. 9 shows the components of the management server in the first embodiment.

FIG. 9 shows the main components of the management server shown in FIG. 1. The management server 27 is located within the ISP network core 11 and therefore communicates with other network entities via at least one network interface 101 such as Ethernet.

A central processor 103 controls the flow of packets from and to the various ports via a storage medium 105 which includes random access memory (RAM) and processor buffers. The various components are communicatively connected via a common data bus 107.

The central processor 103 controls the management server 27 in accordance with program instructions stored on the storage medium 105 or storage on a read only memory (ROM).

When the central processor 103 is executing the program instructions the management server 27 can be regarded as a number of functional component blocks as will be described in the next section.

Management Server Functional Components

Figure 10:
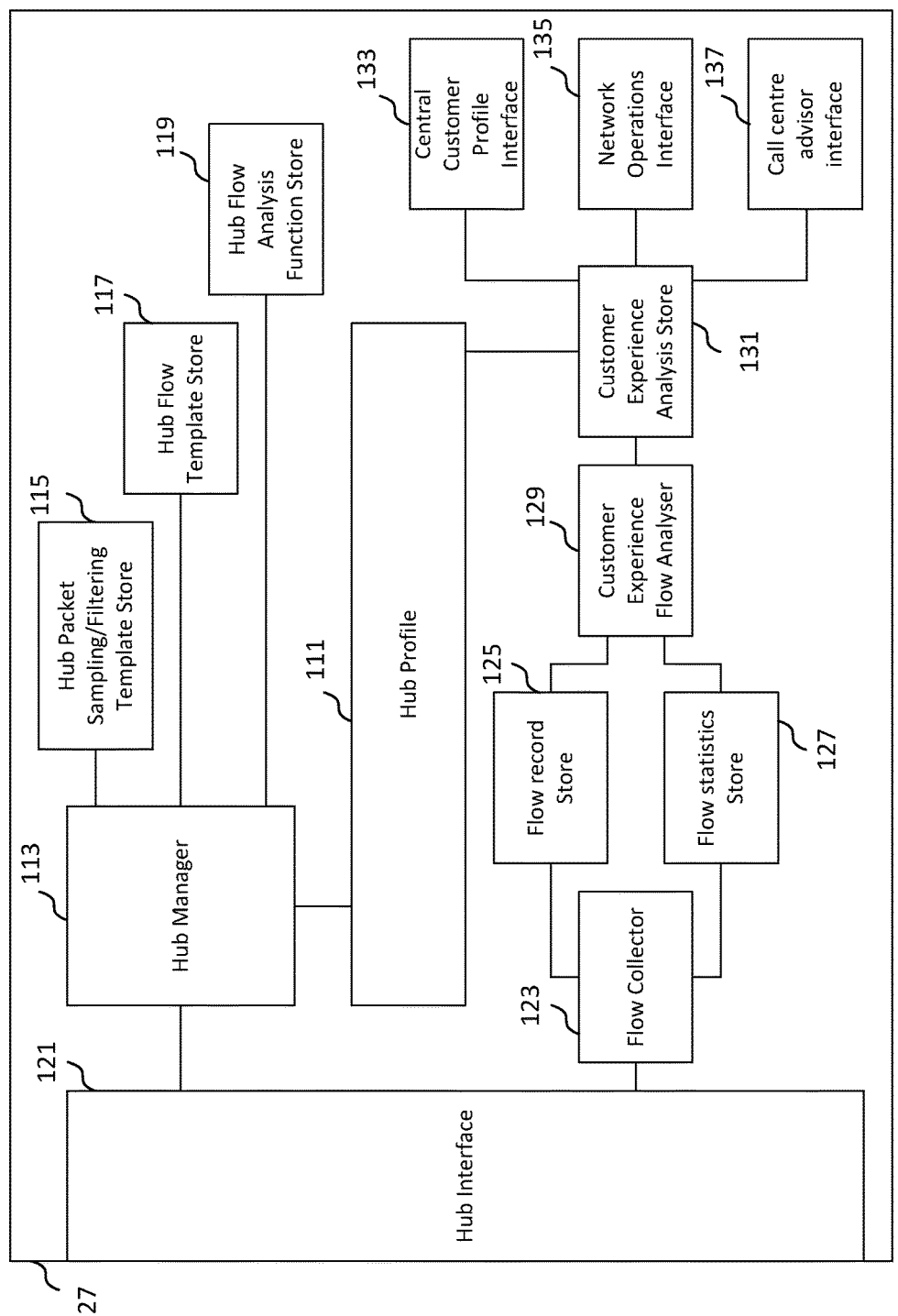
FIG. 10 shows the functional components of a flow analyzer the management server in the first embodiment.

FIG. 10 shows the functional components of the management server 27 in the first embodiment.

A hub profile 111 stores profile information for each hub that is connected to the ISP network 11. The profile contains information used by the other components to control their operation. Each hub's profile entry in the profile store 111 includes identification of which rules should be sent to that hub 3, the geographic location of the hub 3, whether problems have been detected which are affecting the operation of the hub's wireless network 19, etc. and is used by each of the components which will be described later.

The functionality of the management server 27 can be divided into two parts. The first part is concerned with configuring the hubs 3, usually at start up but updates can be pushed during normal operation in response to any detected conditions. Configuration data for the flow processing components of the hubs 3 is stored in a packet sampling filtering template store 115, a flow template store 117 and a flow analysis function store 119.

The hub packet sampling/filter template store 115 contains a complete set of all possible rules which can be used by the packet sampling filtering function 75 of the routing function 57 of a hub 3, stored in that hub's packet sampling/filtering template store 77, in deciding which packets are replicated to the hub flow analyzer 59. The particular subset of available rules used by a particular hub is identified in the hub profile 111. In this embodiment the rules cause packets travelling from or heading to the wireless interface to be replicated.

The hub flow sampling/filtering template store 117 contains a complete set of all possible rules for deciding which types of flows are selected for export by the flow filter function 85 of a hub and stored in the hub's flow sampling/filtering template store 93. The particular subset of available rules used by a particular hub is identified in the hub profile 111. In this embodiment the rules select high priority flows which are sensitive to congestion such as video or VOIP.

The hub flow analysis function store 119 contains a complete set of all possible rules which can be used by the flow analysis function 87 of the flow processor 81 of a hub in analyzing the flows to generate flow records and other analysis metrics. The particular subset of available rules used by a particular hub is identified in the hub profile 111. In this embodiment the hub 3 performs a number of functions to identify new flows and generate metrics relating to the health of those flows which are indicative of the performance of the wireless interface.

A hub manager 113 provides an interface for sending the data in the various stores to the hubs 3 in accordance with the subset information stored in the hub profile 111 for each hub 3. A hub interface 121 is present for data communications to and from the hubs 3 via the network core 11.

The second set of functional components within the management server 27 are for processing the flow record data sent from the hubs 3 to identify any degradation of the wireless network 19 for each hub, for example due to network contention or interference. This part contains a flow collector 123, a flow store 125, a flow statistics store 127, a customer experience flow analyzer 129, a customer experience analysis store 131 which is connected to the hub profile 111, a central customer profile interface 133, a network operations interface 135 and a call centre advisor interface 137.

Flow Record Collection

The flow collector 123 is the IPFIX complement of the hub flow exporter function 89 contained in each hub 3. Flow records and aggregates statistics are received from each hub 3 and stored into the flow records store 125 and the flow statistics store 127 respectively.

The Customer experience flow analyzer 129 uses the information in the flow records store 125 and flow statistics store 127 to carry out various types of analysis. There are two main sets of analysis:

Analysis of each individual hub's wireless network performance; and

Analysis to determine patterns in wireless network performance.

The first type of analysis identifies problems with the wireless link for a particular hub 3. Examples include:

Evaluation of average and peak utilization of the WLAN;

Evaluation of connection/disconnection frequency per device on the WLAN;

Evaluation of physical layer connection quality for each device connected on the WLAN;

Evaluation of radio interference; and

Evaluation of throughput speeds of particular flows over time.

In these types of evaluations, the customer experience flow analyzer 129 looks for changes, generally drops, in the values as an indication of interference on the wireless network of the particular hub being analyzed. Wi-Fi performance loss can be distinguished from a general DSL fault because the DSL performance monitor data will indicate if there have been any resynchronizations of profile changes in the DSL line.

The customer experience flow analyzer 129 maintains running average values of each metric and when there is a change greater than a threshold then the customer experience flow analyzer 129 updates the customer experience analysis store 131 entry for that hub. Once all the evaluations have been carried out, the customer experience flow analyzer 129 makes a final determination of the presence of network degradation for that hub 3.

If poor performance is determined to be occurring, the results of the analysis are stored in the customer experience analysis store. The hub profile 111 is updated and the hub manager 113 will notify the particular hub 3 so that it can update its LED notification and also the hub status page to provide the customer with more information relating to the detected problems. Furthermore, a number of externally connected interfaces such as the network operations interface 135, a central customer interface 133 and a call centre advisor interface 137 are able to access the customer experience analysis store 131 to update respective databases in the ISP network core 11.

The above processing by the customer experience flow analyzer 129 determines whether the wireless network for a particular hub has deteriorated as an indication of contention or interference for that hub.

The second type of processing by the customer experience flow analyzer 129 analyses the flow records and statistical data from multiple hubs to try to identify correlation and patterns in the wireless performance among groups of hubs. For example:

Evaluation of throughput speeds to specific websites such as YouTube in relation to average speeds attained by users on similar speed WAN/DSL connections.

Common faults affecting a group or groups of hubs.

A particular processing will now be described in regard to identifying wide area interference which is affecting a group of hubs in a geographic area.

After the flows from a number of hubs have been analyzed, the customer experience flow analyzer 129 is configured to periodically analyze the hubs which are deemed to be experiencing problems, and correlate those hubs based on their location. The location of the hubs is generally known to the ISP and therefore the customer experience flow analyzer 129 is arranged to extract this information from the appropriate customer database. Alternatively, the hubs 3 can be arranged to send their approximate location with the flow records.

The customer experience flow analyzer 129 can cluster the hubs 3 experiencing wireless problems into predetermined geographic areas; for example, hubs 3 having the same postcodes, neighboring postcodes, building etc. Alternatively the clusters are not of a fixed size but instead a cluster is formed whenever a number of hubs experiencing problems per unit area exceeds a threshold. The clustering size can also be dependent on the relative density of hubs. If a large number of hubs 3 in the same geographic area are experiencing problems with their Wi-Fi connections, then there is a likelihood of a large scale interference is occurring. For example, in FIG. 1 if a misconfigured LTE transmitter 25 is causing interference to hubs 3c and 3d, the flow records and statistical information sent by each hub will be processed by the management server 27 and it will determine that they are both suffering network deterioration/performance degradation. With the additional processing, the management server 27 determines that the hubs 3c and 3d are geographically close to each other and make the determination that both hubs are being affected by the same type and possibly source of interference. The location is determined by accessing the ISP profile information stored in the profile store 17.

Network operations and customer services are then notified of the interference event so that the cause can be rectified before more complaints are raised.

Once the hubs 3c and 3d have been grouped, the management server will also look for other hubs which are known to be neighboring hubs or within the same cluster of hubs and also update their profile information to indicate that a source of interference is known to be in the area. Therefore neighboring hubs which are not currently active and therefore not sending flow records and statistical information for analysis area are noted as being likely to suffer wireless problems. Customer services can be informed and the possibly affected hubs can be updated to reflect the presence of wide area interference by updating their status information.

Such processing can also detect configuration faults/issues such as a large number of hubs 3 setting their wireless access points to use the same channel causing extra contention issues as well as interference.

In the first embodiment a system of hubs having wireless access points located at customer premises and a management server located in the ISP's network core are described. The hubs are modified to analyze data traffic passing via their Wi-Fi interface in accordance with rules and conditions provided by the management server, and then send reports about the traffic to the management server. The management server analyses the data to determine whether the customer's Wi-Fi network is experiencing wireless problems and alerts the customer.

Alternatives and Modifications

In the embodiment, the hub is configured to send flow data to the management server to calculate whether interference is detected. Such an arrangement minimizes the effect of the extra processing on the hub. In a modification, especially for newer hubs having greater processing capacity, the first type of processing can be carried out by the hub itself to identify wireless problems and the management server only needs to be notified of the results of the processing and carry out the second type of processing to look for problems affecting groups of hubs. In this modification, the hub contains further data stores to store historic profile information in order to determine thresholds and make a determination of wireless problems.

In the embodiment, the hub is arranged to only replicate wireless interface packets. In a modification, other interfaces can be monitored to detect problems in performance, for example, if the user wishes to monitor the performance of a Powerline Ethernet section of the network connected to a particular Ethernet port of the hub.

The invention claimed is:

1. A method for monitoring the performance of a plurality of wireless networks created by a plurality of wireless access points, comprising:
   receiving performance data from the plurality of wireless access points;
   analyzing the performance data to identify any wireless access points which are experiencing wireless network performance degradation;
   identifying the location of each wireless access point;
   grouping by regions of location the wireless access points which are experiencing wireless network performance degradation; and
   for each group, determining the cause of the wireless network performance degradation,
   wherein:
   the received performance data comprises:
     for each wireless access point, a set of IP flow records generated by the plurality of wireless access points, each IP flow record corresponding to a data session between a client device and a remote resource via a wireless local area network of the wireless access point, and associated performance statistics, and
     WAN performance metrics indicative of a performance of a WAN link between each wireless access point and an Internet Service Provider; and
   a wireless access point in the plurality of wireless access points is identified as experiencing wireless network performance degradation when:
     the performance statistics for each associated IP flow record of that wireless access point indicate degradation of performance of the wireless local area network, and
     the WAN performance metrics associated with that wireless access point do not indicate degradation of the WAN link.

2. The method according to any claim 1 wherein the wireless access points experiencing wireless network performance degradation are grouped according to predetermined geographic regions.

3. The method according to claim 1, wherein a group is formed when the density of wireless access points experiencing wireless network performance degradation per unit area exceeds a threshold.

4. The method according to claim 1 wherein the determining determines that the cause of wireless network performance degradation is a source of wide area interference affecting at least one of the groups of wireless access points which are geographically near each other.

5. The method according to claim 1, further comprising:
   identifying other wireless access points in a region which may also be experiencing wireless network performance degradation.

6. An apparatus for monitoring the performance of a plurality of wireless networks created by a plurality of wireless access points, comprising:
   a receiver to receive performance data from the plurality of wireless access points;
   a controller configured to:
     analyze the performance data to identify any wireless access points which are experiencing wireless network performance degradation,
     identify the location of each wireless access point;
     group by regions of location the wireless access points which are experiencing wireless network performance degradation, and
     determine the cause of the wireless network performance degradation in each region,
   wherein:
   the received performance data comprises:
     for each wireless access point, a set of IP flow records generated by the plurality of wireless access points, each IP flow record corresponding to a data session between a client device and a remote resource via a wireless local area network of the wireless access point, and associated performance statistics, and
     WAN performance metrics indicative of a performance of a WAN link between each wireless access point and an Internet Service Provider; and
   a wireless access point in the plurality of wireless access points is identified as experiencing wireless network performance degradation when:
     the performance statistics for each associated IP flow record of that wireless access point indicate degradation of performance of the wireless local area network, and
     the WAN performance metrics associated with that wireless access point do not indicate degradation of the WAN link.

7. The apparatus according to claim 6 wherein the wireless access points experiencing wireless network performance degradation are grouped according to predetermined geographic regions.

8. The apparatus according to claim 6, wherein a group is formed when the density of wireless access points experiencing wireless network performance degradation per unit area exceeds a threshold.

9. The apparatus according to claim 6 wherein the controller is configured to determine that the cause of wireless network performance degradation is a source of wide area interference affecting at least one of the groups of wireless access points which are geographically near each other.

10. The apparatus according to claim 6, wherein the controller is further configured to identify other wireless access points in a region which may also be experiencing wireless network performance degradation.

\* \* \* \* \*